United States Patent Office 3,271,073
Patented Sept. 6, 1966

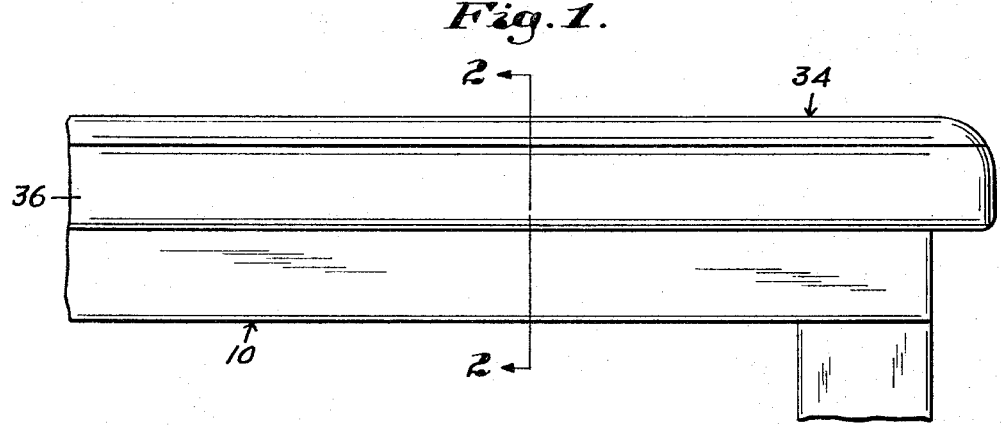
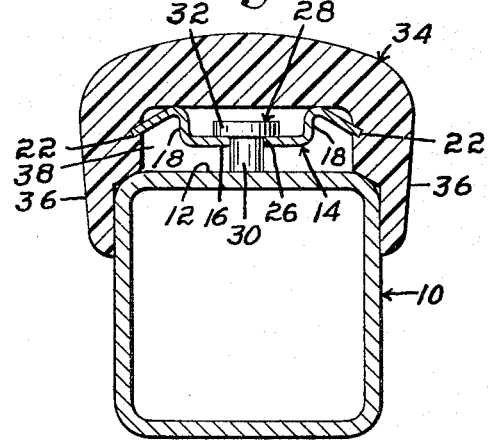
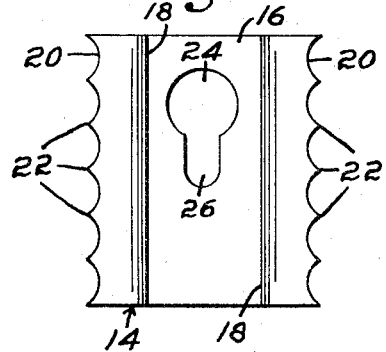

3,271,073
ARM CHAIR FASTENER
Harold S. Van Buren, Jr., Cambridge, Mass., assignor to United-Carr Incorporated, Boston, Mass., a corporation of Delaware
Filed Oct. 23, 1965, Ser. No. 503,821
3 Claims. (Cl. 297—422)

This invention relates generally to fastening devices and more specifically to a fastening device utilizing a stud and slide engageable adapter element.

An object of the present invention is to provide a fastening device having a stud welded or otherwise attached to a support without the necessity of forming an aperture in the support and an adapter element having means of engaging an article to be held with the adapter element using a keyhole slot for engaging the stud.

Another object of the present invention is to provide a stud engaged to a support and an adapter element which includes a keyhole slot and serrated edges for engaging an article to be held.

Other objects of the invention will, in part, be obvious and will, in part, appear hereinafter.

In the drawings:

FIG. 1 is a side elevation of a chair arm broken off,

FIG. 2 is a section taken on line 2—2 of FIG. 1 showing the fastener engaged within the arm, FIG. 3 is a top plan of the fastener.

There is shown in the drawing, a rectangular, tubular support 10 having an engagement face 12. The tubular support 10 may be for example the arm of a tubular chair.

An adapter or socket element 14 comprises a base portion 16, which is generally rectangular in shape, having a wall 18 integral with each of the long edges of the base portion 16 and in right angle relationship therewith. The free terminal edge of each of the walls 18 being bent backward toward the plane of the base portion 16 to provide an engagement edge 20. The engagement edge 20 terminates on a plane spaced from the plane of the base portion 16 and outside of the area encompassed thereby, and is provided with a series of saw-teeth or serrations 22 for a purpose to be described hereinafter. A keyhole slot is formed through the base portion 16 and has a large substantially circular opening 24 and a leg or rectangular extension 26 opening into the circular opening 24 as shown in FIG. 3. The keyhole slot is formed with its leg 26 extending along the length of the base portion 16.

The stud 28 comprises a cylindrical shank 30 which extends from a head portion 32 of larger diameter than the shank 30 and integral with one end thereof.

The adapter 14 can be engaged within an arm pad 34 which has a pair of side walls 36 providing a channel 38. The arm pad 34 is formed of a resilient, polymeric, cushioning material and the adapter 14 is formed of a metal or a fairly hard polymeric material. The distance between the engagement edges 20 of the adapter 14 is greater than the width of the channel 38. The adapter 14 is pushed into the channel 38 at right angles to the length of the arm pad 34 until the two bends abut against the upper surface of the channel and each engagement edge 20 with its serrations 22 dig into a side wall 36. The walls 18 and the base portion 16 provide a cup whereby the base portion 16 is spaced from the upper surface of the channel 38. The stud 28 is either soldered or attached to the engagement face 12 of the tubular support 10 without forming an aperture through the engagement face 12. This engagement may be accomplished by welding, soldering, using adhesives or by other appropriate means. The engagement of the assembly of the adapter 14 and the arm pad 34 with the assembly of the stud 28 and the tubular support 10 is accomplished in the following manner. The head portion 32 of the stud 28 is passed through the circular opening 24 which is of larger diameter than the head portion 32 and the assembly of the arm pad 34 and the adapter 14 are then pushed in a direction to force the cylindrical shank 30 into the leg or rectangular portion 26 of the keyhole slot. Since the diameter of the cylindrical shank 30 is slightly greater than the width of the rectangular portion or leg 26 frictional interference will occur and the underportion of the head portion 32 will be in superposed abutting relationship with the base portion 16 adjacent to the rectangular portion or leg 26 of the keyhole slot. It is preferable that the side walls 36 of the arm pad 34 have a length sufficient to extend below the engagement face 12 and down along the sides of the tubular support 10 as shown in FIG. 2.

With reference to the foregoing description it is to be understood that what has been disclosed therein represents only a single embodiment of the invention and is to be construed as illustrative rather than restrictive in nature; and that the invention is best described by the following claims.

What is claimed is:

1. A combination of a fastening device, a support and an article, said fastening device comprising a rectangular base portion having an upper surface and having side edges, an integral wall extending from each of said side edges in right angle relation to said base portion, each of said walls having a free terminal end bent back toward the plane of said base portion and having a series of serrations formed thereon and a keyhole slot formed through said base portion said keyhole slot having an enlarged portion and a long, narrow portion opening into said enlarged portion, said stud comprising a head portion having a shank portion extending therefrom said shank portion having an inner end, said stud secured at said inner end of said shank to said support without perforating said support and said head portion overlying a portion of said body portion adjacent said long, narrow portion of said keyhole slot, said article having a cavity formed therein and said free terminal ends engaged to said article within said cavity.

2. The combination of a fastening device, a support, and an article, said fastening device comprising a base portion having an upper surface and having side edges an integral wall extending from each of said side edges and angular relation to said base portion, each of said walls having a free terminal end bent back toward the plane of said base portion and a keyhole slot formed through said base portion said stud comprising a head portion having a shank portion extending therefrom said shank portion having an inner end, said stud secured at said inner end of said shank to said support without perforating said support and said head portion overlying a portion of said keyhole slot said article having a cavity formed therein and said free terminal ends engaged to said article within said cavity.

3. The combination of a fastening device, a support and a chair arm pad, said fastening device comprising a rectangular base portion having an upper surface and having side edges, an integral wall extending from each of said edges in right angle relation to said base portion, each of said walls having a free terminal end bent back toward the plane of said base portion and having a series of serrations formed thereon and a keyhole slot formed through said base portion, said keyhole slot having an enlarged portion and a long, narrow portion opening into said enlarged portion, said stud comprising a head portion having a shank portion extending therefrom said shank portion having an inner end, said stud secured at said inner end of said shank portion to said support without perforating said support and said head portion overlying a portion of said body portion adjacent said long, narrow portion of said keyhole slot, said chair arm pad having a cavity defined by an upper portion and two legs extending therefrom in spaced relation to each other and each of said serrations of said free terminal end engaged to one of said legs.

References Cited by the Examiner

UNITED STATES PATENTS

| | | | |
|---|---|---|---|
| 2,690,212 | 9/1954 | Jakeway | 297—422 X |
| 2,901,028 | 8/1959 | Bottemiller | 297—422 X |
| 3,037,814 | 6/1962 | Gardner et al. | 297—460 X |
| 3,170,729 | 2/1965 | Grant | 297—411 |

FRANK B. SHERRY, *Primary Examiner.*

C. A. NUNBERG, *Assistant Examiner.*